(12) United States Patent
Weber et al.

(10) Patent No.: US 8,662,555 B2
(45) Date of Patent: Mar. 4, 2014

(54) GRIPPER FOR CAPTURING AND FOR TRANSPORTING PRODUCTS

(75) Inventors: Markus Weber, Schaffhausen (CH); Oliver Walter, Schaffhausen (CH)

(73) Assignee: Ulma Packaging Technological Center S. Coop, Onati (ES)

( * ) Notice: Subject to any disclaimer, the term of this patent is extended or adjusted under 35 U.S.C. 154(b) by 0 days.

(21) Appl. No.: 13/469,301

(22) Filed: May 11, 2012

(65) Prior Publication Data

US 2012/0286532 A1    Nov. 15, 2012

(30) Foreign Application Priority Data

May 12, 2011 (EP) .................................... 11382146

(51) Int. Cl.
*B25J 15/10* (2006.01)

(52) U.S. Cl.
USPC .......................................... 294/198; 294/208

(58) Field of Classification Search
USPC .............. 294/198, 201, 202, 203, 208, 119.3; 901/37
See application file for complete search history.

(56) References Cited

U.S. PATENT DOCUMENTS

| 3,056,625 | A | * | 10/1962 | Timmerman | 294/106 |
| 3,108,835 | A | * | 10/1963 | Rowekamp | 294/203 |
| 4,244,618 | A | * | 1/1981 | Boyer et al. | 294/203 |
| 4,768,428 | A | * | 9/1988 | Silvestrini et al. | 99/551 |
| 4,790,587 | A |  | 12/1988 | Stoll |  |
| 5,163,804 | A |  | 11/1992 | Kobayashi |  |
| 5,263,753 | A | * | 11/1993 | Breu et al. | 294/99.1 |
| 6,170,895 | B1 | * | 1/2001 | Schopp et al. | 294/203 |
| 6,666,489 | B2 |  | 12/2003 | Kruger |  |
| 8,011,708 | B2 | * | 9/2011 | Becker et al. | 294/196 |
| 2004/0207222 | A1 |  | 10/2004 | Miyamoto |  |

FOREIGN PATENT DOCUMENTS

| DE | 3413633 A1 | 10/1985 |
| DE | 3504100 A1 | 8/1986 |
| DE | 3504100 C2 | 8/1986 |
| FR | 2663622 A1 | 12/1991 |
| FR | 2721914 A1 | 1/1996 |

OTHER PUBLICATIONS

Extended European Search Report, European Patent Application No. 11382146.6, Search completed Oct. 13, 2011, Date of Mailing Oct. 31, 2011, 4 pages, EPO Munich Germany.

* cited by examiner

*Primary Examiner* — Dean Kramer
(74) *Attorney, Agent, or Firm* — Tim L. Kitchen; Peter B. Scull; Hamilton, DeSanctis & Cha, LLP

(57) ABSTRACT

A gripper for capturing and transporting a food product. In one implementation the gripper has first and second arms having first end portions that cooperate with each other to capture the food product. In a first pivot position the first end portion of the first arm is positioned to cooperate with the first end portion of the second arm to capture the food product, whereas in a second pivot position the first end portion of the first arm is positioned not to cooperate with the first end portion of the second arm. The gripper has an expandable fluid chamber that in an expanded state acts on a portion of the first arm to cause the first arm to assume the first pivot position.

15 Claims, 3 Drawing Sheets

GRIPPER FOR CAPTURING AND FOR TRANSPORTING PRODUCTS

CROSS-REFERENCE TO RELATED APPLICATIONS

The present application relates to and claims priority to European Patent application No. 11382146.6, filed May 12, 2011.

FIELD

This invention relates to grippers for capturing and transporting foodstuffs, and in particular to grippers for capturing and transporting foodstuffs, adapted for use in packaging processes.

BACKGROUND

Grippers for capturing and transporting products of different characteristics are well known from prior art, said products including foodstuffs, for example.

These types of grippers comprise a plurality of arms, which open and/or close like jaws to capture or release a product. Each arm comprises a main end and when the gripper closes to capture a product both main ends move towards each other, trapping the product between them. Different means for causing the opening and closing of the arms are also known.

Document US 20040207222 A1 discloses a gripper with two arms, both arms pivoting in relation to a corresponding axis of rotation to open or close the gripper, the rotation being caused by the rectilinear movement of an actuating piece.

Document U.S. Pat. No. 6,666,489 B2 discloses a gripper with two arms in which one of the arms pivots in relation to an axis of rotation so that the gripper captures or releases a product, the other arm remaining in a fixed position. The pivoting of the arm is performed by means of a cylinder, through the movement of its rod.

SUMMARY

It is an object of this invention to provide a gripper for capturing and transporting foodstuffs, as described in the claims.

The gripper for capturing and transporting foodstuffs of the invention comprises a plurality of arms. Each arm comprises a main end, and all the main ends cooperate with each other to capture a product in the manner of a jaw, at least one of the arms being adapted to pivot in relation to a corresponding point of rotation so that the main ends capture the product.

The pivoting for capturing or seizing the product is performed by means of a fluid that acts on the arm that is adapted to pivot. As a result, the pressure exerted on the product by the gripper can be regulated in a simple and efficient manner, thereby controlling the amount and/or the pressure of the fluid that acts on the arm, ensuring a correct seizure of the product that prevents its accidental release and an excessive seizure that may cause unwanted damage to the product.

These and other advantages and characteristics of the invention will be made evident in the light of the drawings and the detailed description thereof.

DETAILED DESCRIPTION

Figure 3:
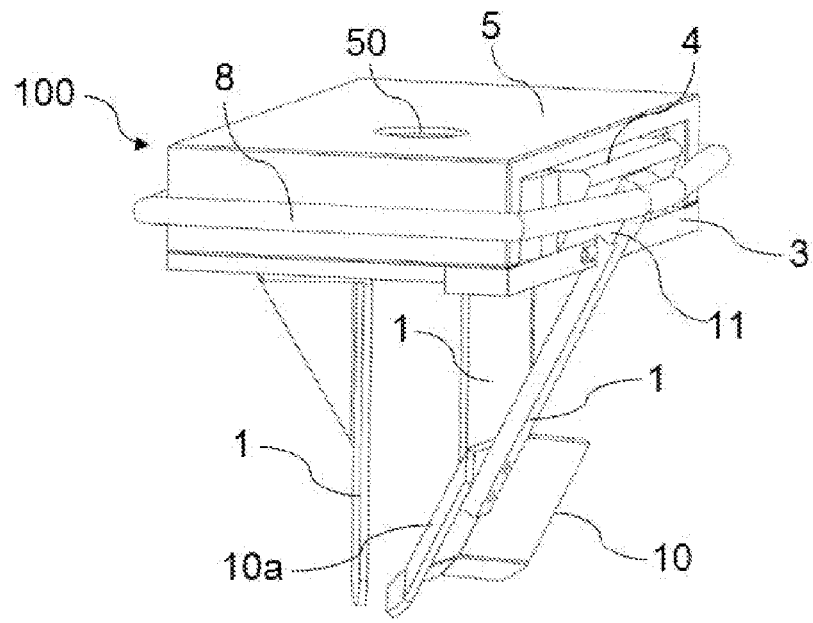
FIG. 3 shows the gripper according to the embodiment of FIG. 1, without a cover and with an arm in a closed position.
Figure 4:
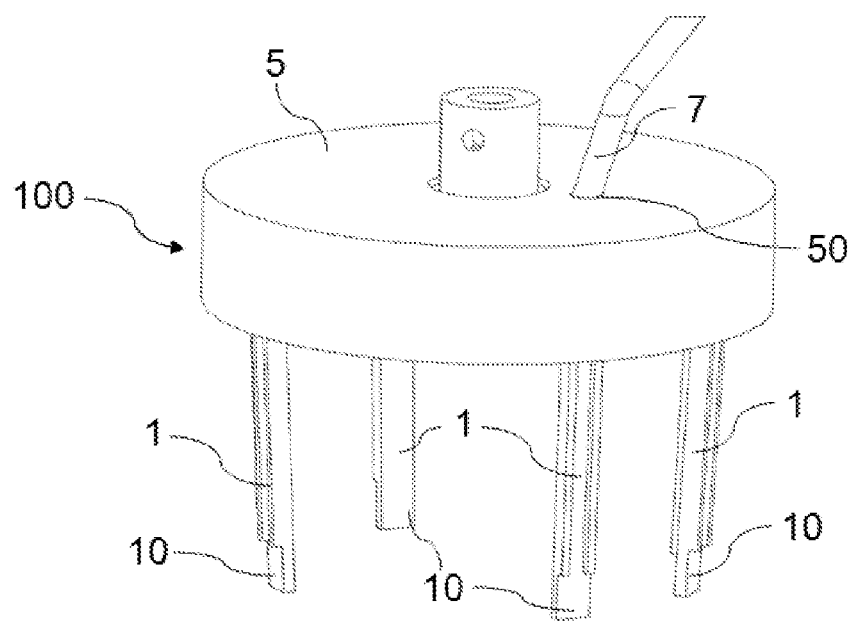
FIG. 4 shows a perspective view of a second embodiment of the gripper of the invention.
Figure 5:
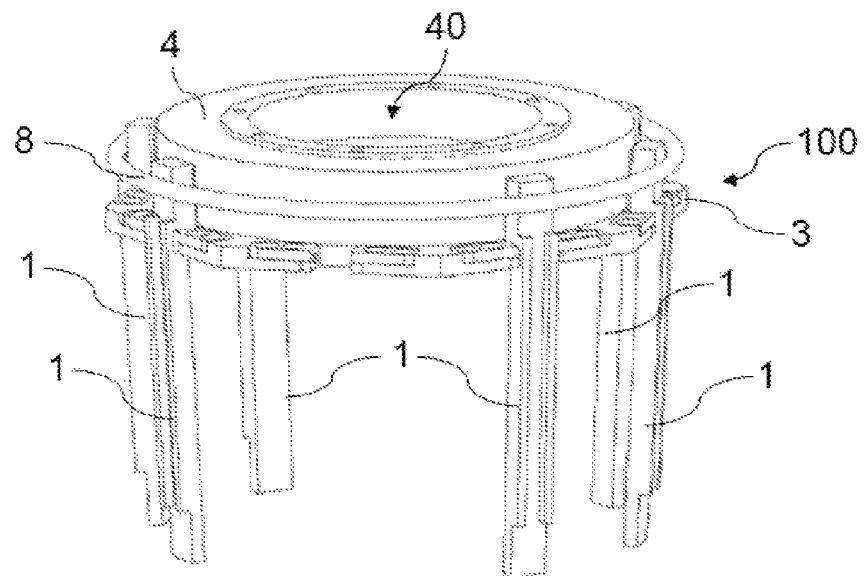
FIG. 5 shows the gripper according to the embodiment of FIG. 4, without a cover and with the arms in an open position.
Figure 6:
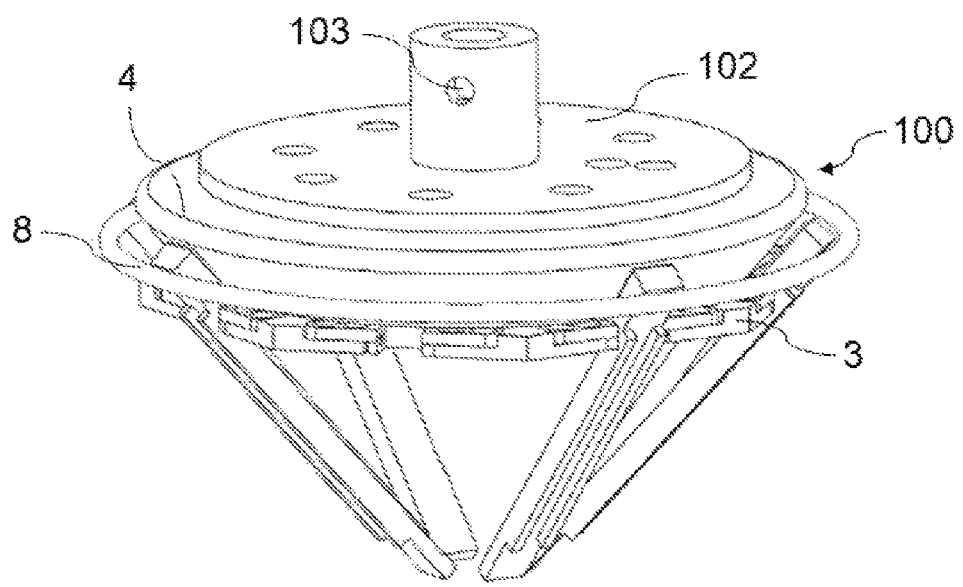
FIG. 6 shows the gripper according to the embodiment of FIG. 4, without a cover and with the arms in a closed position.

FIGS. 1 to 4 show a first embodiment of the gripper 100 for capturing and transporting foodstuffs of the invention, which is designed to capture objects with a uniform shape such as sausages. FIGS. 5 to 7 show a second embodiment of the gripper 100 for capturing and transporting foodstuffs of the invention, which is designed to capture objects with a non-uniform shape, such as chicken wings or breasts.

In both embodiments the gripper 100 comprises a plurality of arms 1 that cooperate with each other to capture the product in the manner of a jaw. Each arm 1 comprises a main end 10 and the product is captured between all the main ends 10 of the arms 1 of the gripper 100, with all the main ends 10 cooperating with each other to capture a product. In order to perform the capture at least one of the arms 1 is adapted to pivot in relation to a point of rotation, causing the main end 10 of said arm 1 to move closer to the other main ends 10 of the different arms 1, the product being captured or trapped between said arms 1.

In both embodiments the gripper 100 comprises an actuator to cause, when the product is to be captured, a fluid to push a distal end 11 opposite to the main end 10 of the arm 1 (or the arms 1) that can pivot, thereby causing the arm 1 to pivot in relation to the point of rotation, the main ends 10 of the different arms 1 being brought closer to each other.

In both embodiments the gripper 100 comprises a support structure 3 to which the arms 1 are connected, and a chamber 4 disposed on the support structure 3 where the fluid that pushes the distal end 11 of any arm 1 that can pivot is introduced, the chamber 4 expanding when the fluid is introduced into its interior. Any arm 1 that can pivot is connected to a side of the support structure 3 with the possibility of pivoting, the point of connection between said arm 1 and the support structure 3 corresponding with the point of rotation. The main end 10 is beneath the support structure 3 whereas the distal end 11 is above the support structure 3. As a result, the chamber 4 is in contact with the distal end 11, and when, due to the introduction of the fluid, the chamber 4 expands, said chamber 4 pushes the distal end 11, causing the corresponding arm 1 to pivot in relation to the point of rotation.

In both embodiments, the gripper 100 comprises an elastic assembly 8 to cause any arm 1 that has pivoted due to the fluid to return to its original position once said fluid has been removed from the chamber 4, and to keep the arms 1 in their original position while there is no fluid in the chamber 4, which can correspond to a rubber piece or equivalent member, for example. The elastic assembly 8 surrounds, at least partially, the chamber 4, and the distal end 11 of any arm 1 that can pivot is disposed between the elastic assembly 8 and the chamber 4. As a result, when a fluid is introduced into the chamber 4, this expands and exerts a force against the distal end 11 that is greater than that exerted by the elastic assembly 8, causing the arm 1 to pivot, whereas when the fluid is removed the elastic assembly 8 exerts a force in an opposite direction to recover their original shape, causing said arm 1 to pivot in the opposite direction, returning to its original position.

On the introduction of the fluid into the chamber 4 to cause the arms 1 to capture a product, when one of the arms 1 makes contact with the product the fluid is distributed in the interior of the chamber 4 so that when all the arms 1 make contact with the product they do so exerting the same pressure on said product, thereby resulting in a uniform and safe seizure of the product.

Figure 1:
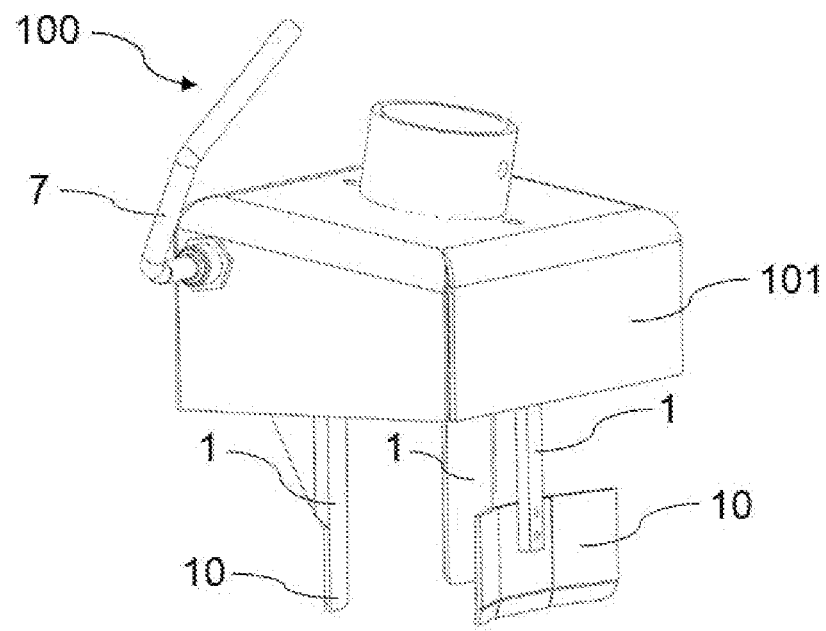
FIG. 1 shows a perspective view of a first embodiment of the gripper of the invention.
Figure 2:
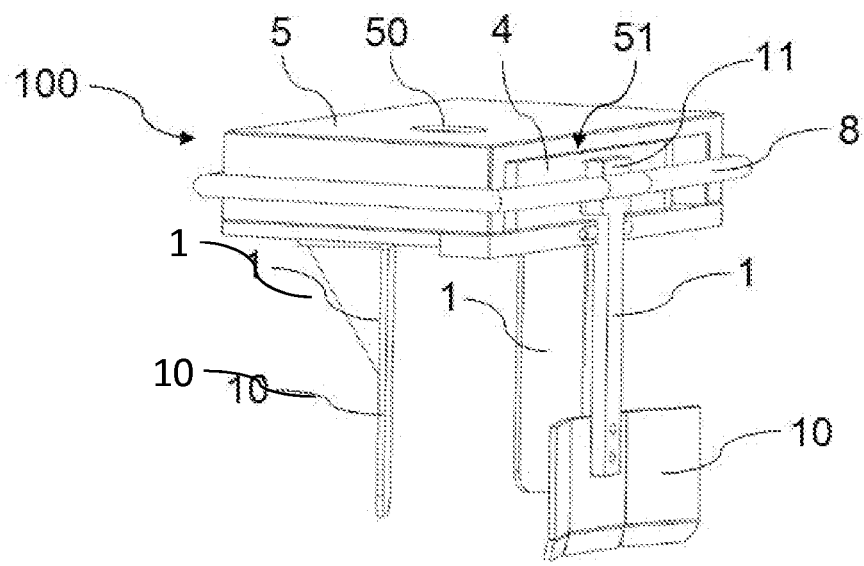
FIG. 2 shows the gripper according to the embodiment of FIG. 1, without a cover and with an arm in an open position.

In the first embodiment, as the shape of the product to be captured is uniform, the necessary arms 1 can be disposed in a certain shape that depends on the product to be captured and it is not necessary for all the arms 1 to pivot, the gripper 100 being capable of comprising an arm 1 that can pivot. The arms 1 that cannot pivot are fixed to the support structure 3. FIG. 2 shows the first embodiment of the gripper 100 with said arm 1 in an open position where it has not pivoted, and FIG. 3 shows the first embodiment of the gripper 100 with the arm 1 in a closed position where it has pivoted to capture a product. In addition, to help capture the product, the main end 10 of at least one of the arms 1 can comprise a suitable shape so that the product is held correctly by the arms 1, a shape that depends on the product to be captured, said main end 10 thus comprising a surface of contact 10a greater than the rest of the main ends 10, as shown in FIG. 3. In addition, the main end 10 of the arm 1 that can pivot can be flexible, so that it can be easily adapted to the shape of the product to be captured, thereby ensuring a correct seizure of the product.

In the first embodiment the gripper 100 preferably comprises a cover 5 shown in FIGS. 2 and 3 that is attached to the support structure 3, the chamber 4 being disposed and delimited between the support structure 3 and the cover 5. In addition, either the cover 5, on a surface that faces the support structure 3, or the support structure 3, on a surface that faces the cover 5, can comprise a housing not shown in the figures, adapted to house the chamber 4. Said cover 5 is also covered, preferably by a cover 101 shown in FIG. 1.

In the first embodiment, the cover 5 covers the chamber 4 both by the top part and by its outer perimeter, and comprises a window 51 through which the chamber 4 can expand. The distal end 11 of the arm 1 that can pivot faces the window 51, so that the chamber 4 can push said distal end 11 causing the pivoting of the arm 1. The elastic assembly 8 surrounds the perimeter of the cover 5, surrounding the chamber 4 along the length of the window 51 of the cover 5 and covering in said length the distal end 11 of said arm 1.

In the first embodiment, the chamber 4 comprises a valve or an equivalent member through which the fluid can be introduced into or removed from its interior, and the actuator comprises a pipe 7 through which the fluid reaches the valve so that it can be introduced into the chamber 4. Preferably, the cover 5 comprises a through hole 50 that is passed through by the pipe 7 to reach the chamber 4, although the through hole 50 can be in the support structure 3.

In the second embodiment, as the product to be captured is not uniform, all the arms 1 of the gripper 100 can pivot in relation to the support structure 3. FIG. 4 shows the second embodiment of the gripper 100, with the arms 1 in an open position where they do not capture a product, and FIG. 5 shows the second embodiment of the gripper 100, with the arms 1 in a closed position that is the position they adopt to capture a product. The chamber 4 comprises a substantially circular shape with a central space 40, as shown in the FIG. 5, and the gripper 100 can comprise a support 102, shown in FIG. 6, which is disposed in the central space 40 that defines and supports the chamber 4, both the chamber 4 and the support 102 being capable of being covered by a cover 5, the chamber 4 being disposed and delimited between the support structure 3 and the cover 5.

In the second embodiment, the elastic assembly 8 covers the distal ends 11 of all the arms 1, thereby surrounding the chamber 4. The cover 5 covers the chamber 4 by its top part and its outer perimeter, acting as a cover, as shown in FIG. 4.

As in the first embodiment, in the second embodiment the chamber 4 can comprise a valve or an equivalent member through which the fluid is introduced into or removed from its interior, and the actuator comprises a pipe 7 through which the fluid reaches the valve so that it can be introduced into the chamber 4. Preferably, the cover 5 comprises a through hole 50 that is passed through by the pipe 7 so that it can reach the chamber 4, although the through hole 50 can be in the support structure 3.

What is claimed is:

1. A gripper for capturing and transporting a food product comprising:
   a plurality of arms comprising three or more arms, each of the plurality of arms having a first end portion that cooperate with each other to capture the food product by pressure exerted between the first end portions, each of the plurality of arms having a second end portion opposite the first end portion and adapted to pivot between a first pivot position and a second pivot position, in the first pivot position the first end portions cooperate with one another to capture the food product, in the second pivot position the first end portions of do not cooperate with one another so as not to capture the food product;
   a single expandable fluid chamber having an unexpanded state and an expanded state, the single expandable fluid chamber assuming the expanded state upon the introduction of a fluid into the chamber, in the expanded state portions of the single expandable fluid chamber simultaneously act on the second end portions of the plurality of arms to cause the plurality of arms to assume the first pivot position, in the unexpanded state the plurality of arms assume the second pivot position; and
   a single elastic assembly that acts simultaneously on all of the second end portions of the plurality of arms to continuously urge the second end portions inward toward the single expandable fluid chamber.

2. A gripper according to claim 1, wherein the single elastic assembly acts on the second end portions of the plurality of arms to cause the plurality of arms to assume the second pivot position when the single expandable fluid chamber is in the unexpanded state.

3. A gripper according to claim 1, further comprising a support structure upon which the plurality of arms and single expandable fluid chamber are supported, the plurality of arms being pivotally attached to the support structure.

4. A gripper according to claim 3, wherein the support structure is circular and the plurality of arms are pivotally attached about the periphery of the support structure, the single expandable fluid chamber also being circular.

5. A gripper according to claim 3, wherein the support structure is circular and the plurality of arms are pivotally attached equidistantly about the periphery of the support structure, the circular support structure having a first diameter, the single expandable fluid chamber also being circular and having an unexpanded diameter of less than or equal to the first diameter and an expanded diameter that is greater than the first diameter.

6. A gripper according to claim 5, wherein the single elastic assembly acts on the second end portion of the plurality of arms to cause the plurality of arms to assume the second pivot position when the single expandable fluid chamber is in the unexpanded state.

7. A gripper according to claim 1, further comprising a fluid conduit and fluid valve through which the fluid is introduced into or removed from the interior of the single expandable fluid chamber.

8. A gripper according to claim 1, wherein the fluid is pressurized air.

9. A gripper according to claim 1, wherein the single expandable fluid chamber assumes the expanded state upon the introduction of a pressurized fluid into the chamber.

10. A gripper according to claim 1, wherein the single elastic assembly comprises a single resilient member that at least partially surrounds the single expandable fluid chamber, the second end portions of the plurality of arms being positioned between the single expandable fluid chamber and the single resilient member.

11. A gripper according to claim 10, wherein the single expandable fluid chamber radially expands to simultaneously act on the second end portions of the plurality of arms.

12. A gripper according to claim 10, further comprising a cover that at least partially covers the single expandable fluid chamber.

13. A gripper according to claim 10, wherein the single expandable fluid chamber has a top part and an outer perimeter, the gripper further comprising a cover that covers the top part and outer perimeter of the single expandable fluid chamber.

14. A gripper according to claim 1, further comprising a cover that at least partially covers the single expandable fluid chamber.

15. A gripper according to claim 1, wherein the single expandable fluid chamber has a top part and an outer perimeter, the gripper further comprising a cover that covers the top part and outer perimeter of the single expandable fluid chamber.

\* \* \* \* \*